Dec. 29, 1970　　J. J. CERVENKA ET AL　　3,550,250
MACHINE FOR APPLYING TERMINALS TO BOBBINS
Filed Feb. 28, 1968　　8 Sheets-Sheet 3
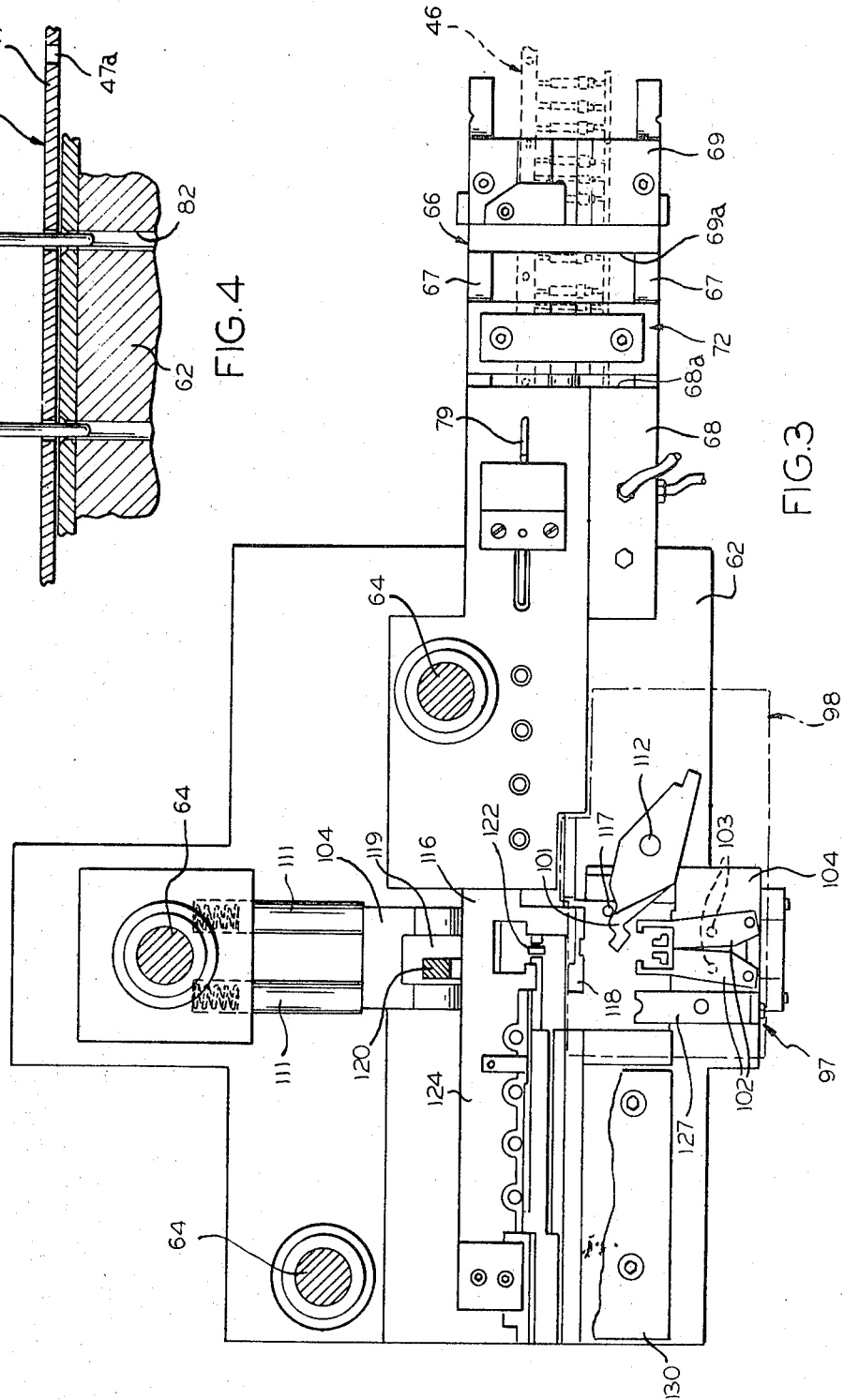
INVENTORS
JOSEPH J CERVENKA
MARVIN E. HETZEL
BY
Mazell, Johnston, Cook & Root
ATTORNEYS

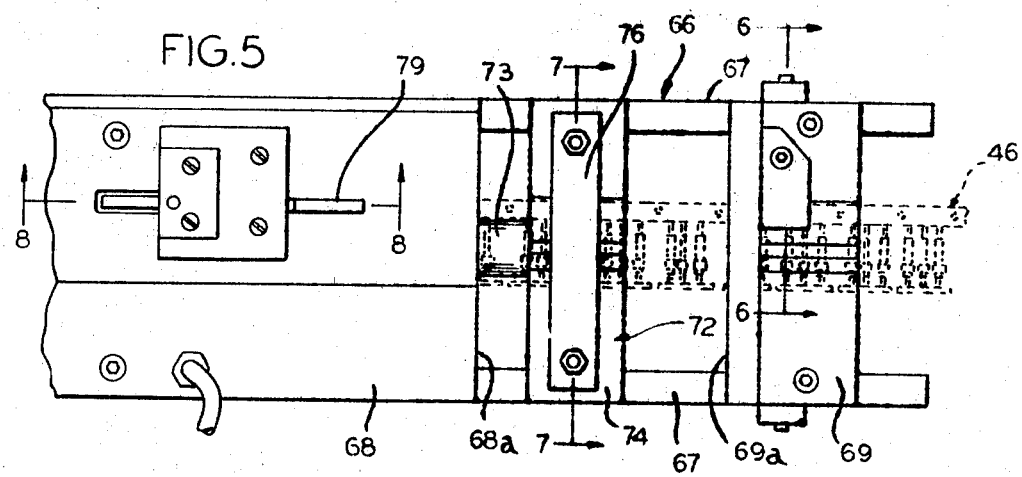
FIG. 5
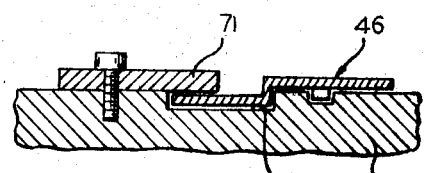
FIG. 6
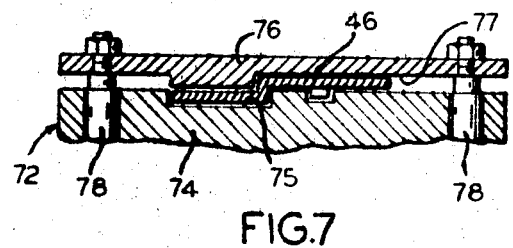
FIG. 7
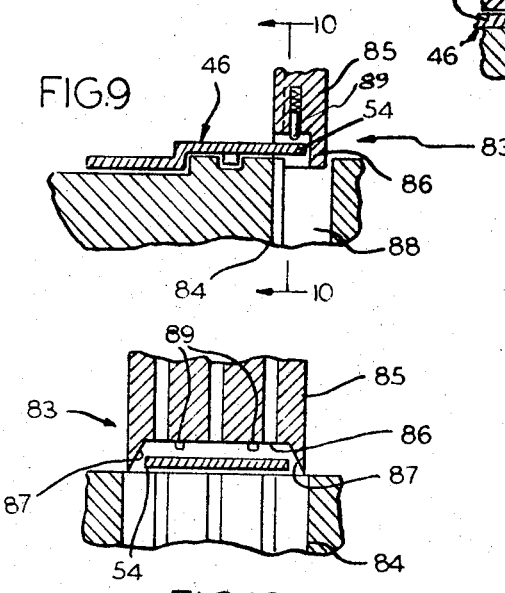
FIG. 9
FIG. 10
FIG. 8
FIG. 11
INVENTORS
JOSEPH J. CERVENKA
MARVIN E. HETZEL
BY
ATTORNEYS

INVENTORS
JOSEPH J. CERVENKA
MARVIN E HETZEL
BY
ATTORNEYS

Dec. 29, 1970 J. J. CERVENKA ET AL 3,550,250
MACHINE FOR APPLYING TERMINALS TO BOBBINS
Filed Feb. 28, 1968 8 Sheets-Sheet 8
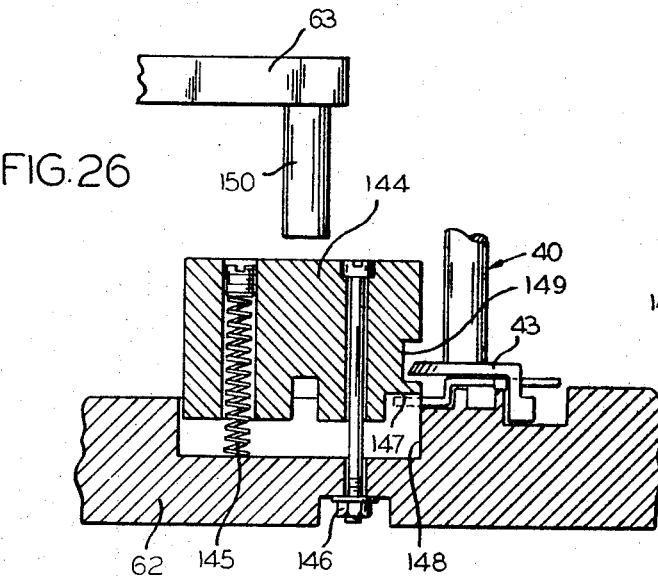
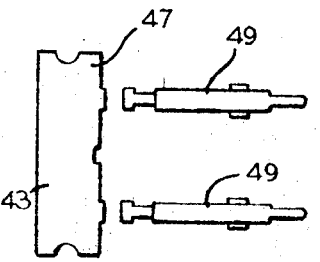
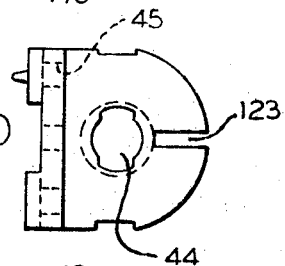
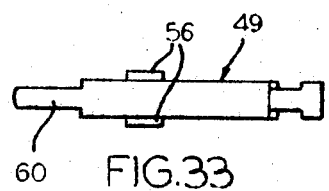
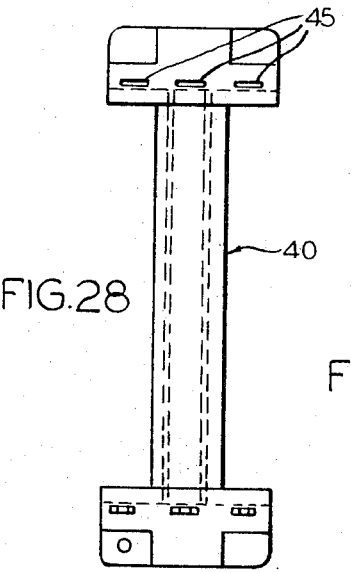
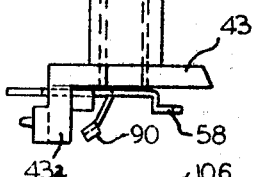
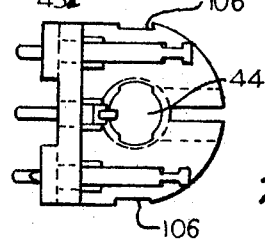
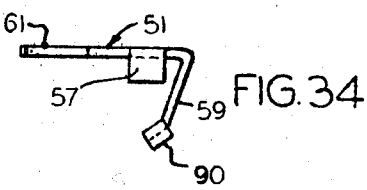
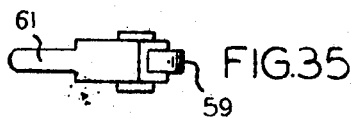
INVENTORS
JOSEPH J. CERVENKA
MARVIN E. HETZEL
BY
Mazzell, Johnston, Cook & Root
ATTORNEYS United States Patent Office 3,550,250
Patented Dec. 29, 1970

3,550,250
MACHINE FOR APPLYING TERMINALS
TO BOBBINS
Joseph J. Cervenka, 428 E. Crescent, Elmhurst, Ill.
60126, and Marvin E. Hetzel, 177 Michaux Road,
Riverside, Ill. 60546
Filed Feb. 28, 1968, Ser. No. 709,109
Int. Cl. B23p 19/00; H05k 13/04; H01r 43/00
U.S. Cl. 29—429                                    12 Claims

ABSTRACT OF THE DISCLOSURE

A machine for receiving a continuous strip of terminal sets and bobbins for successively mounting a set of terminals on each bobbin, wherein the machine includes means indexing the strip through a plurality of work stations and for handling the separation of the terminals from the strip, together with a holder for receiving the bobbin and inserting the bobbin onto a set of terminals, and the means staking the terminals to the bobbin.

---

This invention relates in general to a continuous terminal strip having spaced sets of terminals and a machine for applying the terminals to bobbins, and more particularly to the method and apparatus for quickly and easily securing terminals to a bobbin that ultimately becomes a reed relay switch.

Mounting of terminals on bobbins heretofore has necessitated individual application of terminals to a bobbin which has been time consuming and costly. Modern day industry requires development of manufacturing techniques and apparatus to overcome the spiraling labor cost. In the field of relays, faster and more economical constructions obsolete heretofore known assembling machines and parts.

The present invention concerns the economics of applying terminals to a bobbin for a reed relay switch, although it should be appreciated that the present invention might well apply in the application of terminals to other types of bobbins. However, the invention is especially useful where it is necessary to apply a plurality of terminals to either or both ends of a bobbin. In a reed relay, these terminals would be employed for connecting leads from the coil and from the reed switch to facilitate application of a power source and incorporation in suitable circuitry.

In general, terminal receiving openings are provided in a bobbin, and terminals are placed in the openings and secured to the bobbin. Additionally, metal forming operations are performed on one or more of the terminals before or after placement in the terminal receiving opening of the bobbin.

The terminals to be applied to a bobbin are formed on a continuous terminal strip where the terminals are arranged in sets. One set would be employed for each end of a bobbin. The continuous strip of terminal sets includes generally a carrying and registering ribbon having the terminals extending from one edge. The outer ends of the terminals are initially connected together by an anti-distortion bar so that when the strip is arranged in coil form on a reel, the terminals of each set can be maintained substantially in the same planar relation to facilitate reception by an applicating machine. The carrying and registering ribbon enables the feeding of the strip of terminal sets through the applicating machine and the registering of the sets at predetermined work stations.

The terminal applicating machine receives the continuous strip of terminal sets and bobbins, and effects application of the terminals to the bobbins. In the process, the anti-distortion bar is cut from the ends of the terminals to enable movement of a bobbin onto the terminals. The strip of terminal sets is advanced step by step through the applicating machine, but is stationary during the initial application of a bobbin onto a terminal set, wherein the bobbins are applied at a work station and moved onto the terminal sets so that the terminals will be received in the terminal receiving openings of the bobbins. Prior to insertion of a bobbin onto a terminal set, one of the terminals is preformed to enable it to be properly applied to a bobbin. At the bobbin insertion station, that same terminal is severed from the carrying and registering ribbon. Following insertion of a bobbin onto a set of terminals, the bobbin is carried through the machine by the carrying and registering ribbon of the strip of terminal sets as it moves in step-by-step fashion. Subsequently, any number of the terminals may be permanently secured to the bobbin as by a staking operation. Thereafter, additional metal forming operations further form a portion of one terminal, and finally the other terminals are cut from the carrying and registering ribbon to release the bobbin with its set of terminals from the machine. It should be appreciated that other metal forming operations may be applied to any of the terminals if it should be necessary for a particular installation.

Accordingly, it is an object of this invention to provide a method of applying a set of terminals from a continuous strip of terminal sets to a bobbin that enables fast and economical mounting of terminals on a bobbin.

Still another object of this invention is in the provision of a machine capable of receiving a continuous strip of terminal sets and applying terminals to bobbins that are also received by the machine, wherein the machine operates quickly and is capable of economically mounting the terminals on a bobbin.

Other objects, features and advantages of the invention will be apparent from the following detailed disclosure, taken in conjunction with the accompanying sheets of drawings, wherein like reference numerals refer to like parts, in which:

FIG. 3 is a top plan view of the base of the machine of the present invention, with some parts removed and other parts broken away for purposes of clarity;

FIG. 4 is a greatly enlarged vertical sectional view taken along the path of movement of the strip of terminal sets, and illustrating the coacting head pilot pins and base pilot pin holes for registering the strip of terminal sets in precise location as it is moved through the machine in step-by-step fashion;

FIG. 5 is an enlarged plan view of the strip feeder;

FIG. 6 is an enlarged fragmentary detailed sectional view taken substantially along line 6—6 of FIG. 5;

FIG. 7 is an enlarged fragmentary detailed sectional view taken substantially along line 7—7 of FIG. 5;

FIG. 8 is an enlarged fragmentary detailed sectional view taken substantially along line 8—8 of FIG. 5;

FIG. 9 is an enlarged fragmentary detailed sectional view taken through the anti-distortion bar cutter;

FIG. 10 is a sectional view taken substantially along line 10—10 of FIG. 9;

FIG. 11 is a fragmentary top plan view of the continuous strip of terminal sets according to the invention;

FIG. 26 is a sectional view taken through the coacting cutting members for cutting of the carrying and registering strip from the terminals after they have been mounted on a bobbin;

FIG. 27 is a top plan view of a part of the carrying and registering ribbon and illustrating the manner in which the outer terminals are cut therefrom;

FIG. 28 is an elevational view of a bobbin upon which the terminals of the present invention are mounted and illustrating the terminals mounted in position at the lower end;

FIG. 29 is a side elevational view of the bobbin and mounted terminals as shown in FIG. 28;

FIG. 30 is a top plan view of the bobbin;

FIG. 31 is a bottom plan view of the bobbin;

FIG. 32 is a side elevational view of one of the outer terminals of a terminal set according to the present invention;

FIG. 33 is a bottom plan view of the terminal in FIG. 32;

FIG. 34 is a side elevational view of a center terminal of a terminal set and illustrating the one end bent as when mounted in a bobbin; and FIG. 35 is a bottom plan view of the terminal of FIG. 34.

Figure 1:
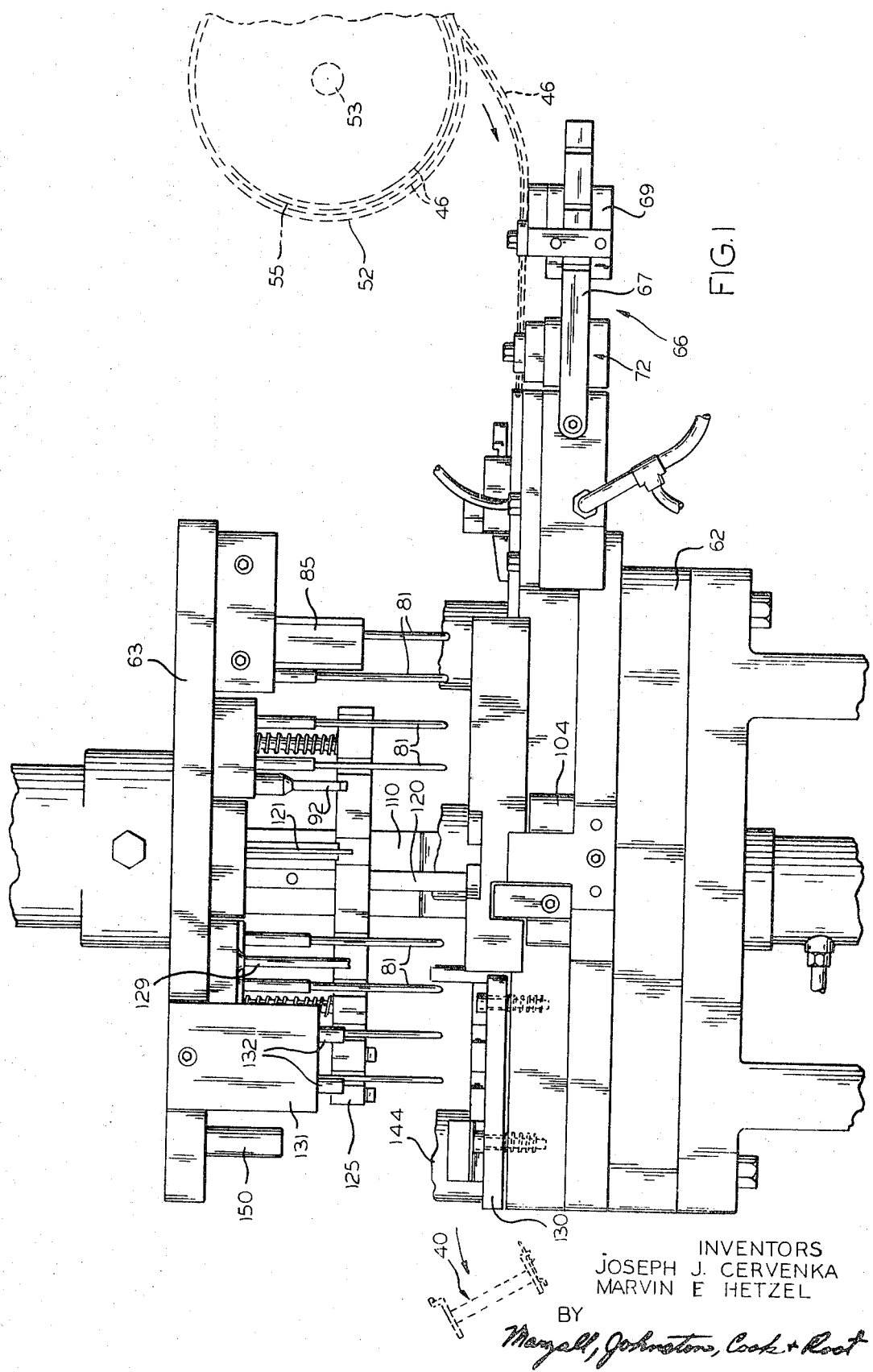
FIG. 1 is a fragmentary front elevational view of the terminal applicating machine according to the present invention, showing some parts in phantom for purposes of clarity, and illustrating the head of the machine in its upward resting position.

The present invention, being concerned with the fast and economical mounting of terminals on a bobbin, relates to a continuous strip of terminal sets, a part of which is illustrated in FIG. 11, and a machine for mounting terminal sets on bobbins. The machine is especially illustrated in FIGS. 1-3.

While the invention is principally shown relative to the mounting of terminal sets to a bobbin that is especially useful for a reed relay, it should be appreciated that the mounting of terminal sets to any type of relay in a similar fashion as contemplated by the present invention is within the scope of the invention. Essentially, a continuous strip of terminal sets is fed into the machine in step-by-step fashion, while bobbins are also fed into the machine, one at a time, to coordinate with the strip of terminal sets and effectively mount a set of terminals on one end of each bobbin. To illustrate the invention, a reed relay bobbin is shown in FIGS. 28–31.

This bobbin may be generally indicated by the numeral 40 and includes a tubular portion 41 having flanges 42 and 43 at opposite ends. The tubular member 41 is hollow or provided with a hole 44 extending completely therethrough, and in which is received a well known reed switch. Wire is wound about the tubular member 41 and against the end flanges 42 and 43 to define a coil that is capable of actuating the reed relay switch arranged in the opening 44 upon energization. Outwardly extending flanges or bars 42a and 43a are provided at one of the ends of each of the flanges 42 and 43, and through which extend terminal receiving openings 45. Terminals are shown mounted in the lower bar 43a, while the upper bar 42a is devoid of terminals for purposes of illustration. The assembly of a reed relay with the bobbin 40 which is preferably molded of an insulating material, includes the mounting first of terminals at opposite ends of the bobbin, and thereafter the winding of a coil on the tubular member. The reed switch is then properly positioned within the bobbin and the leads from the reed switch and the coil can then be suitably secured to the desired terminals, such as by soldering or the like. The relay is then ready for use where needed. It can be appreciated that some of the terminals would be employed for applying power to the coil, while other of the terminals would serve to permit connection of the reed switch into suitable circuitry. The terminal receiving openings are equally spaced apart in the bar member 42a and at the base thereof so that the terminals when mounted in the openings are arranged against the respective flanges 42 and 43.

The continuous strip of terminal sets, generally designated by the numeral 46 as seen in FIG. 11, includes a carrying and registering ribbon 47 having terminal sets 48 extending from one edge and in spaced relation from each other. Each terminal set includes three terminals. Outer terminals 49 are identical with each other and spaced from an inner or central terminal 51. The terminals are arranged in parallel relationship and extend perpendicularly from the carrying and registering ribbon. As shown in FIG. 1, the continuous strip of terminals is wound on a reel or spool 52 that is freely rotatable on a shaft 53 which is mounted at one side of the applicating machine, and from which a continuous strip of terminal sets is taken as needed by the machine. The terminals are also arranged in substantially coplanar relation. In order to maintain the terminals of each set in such a relation, an anti-distortion bar 54 is provided on the outer free ends of the terminals at the ends remote from the carrying and registering ribbon 47. This anti-distortion bar is eventually severed from the terminals before insertion in and mounting on a bobbin. To further preclude entanglement of the terminals sets when the continuous strip of terminal sets is wound on the reel 52, a papar tape 55 is mound between coils of the terminal strip. This paper tape need only have a width sufficient to cover the terminal portion of the strip.

Each of the terminals 49 includes downwardly extending ears 56, and a center terminal 51 includes downwardly extending ears 57, all of which serve to properly orient these terminals in the bobbin during the staking operation. The terminals 49 include wire attaching ends 58 that are offset from the main part of the terminal to space same from an end flange of the bobbin as seen in FIG. 30. The terminals 51 include a wire attaching end 59 that is bent out of position so as to leave the center hole 44 completely unobstructed which permits the insertion of a reed switch during the final stages of the assembly of the relay. The other ends 60 and 61 of the terminals 49 and 51 serve to permit connection to suitable sockets of further connection to other circuitry leads.

Figure 2:
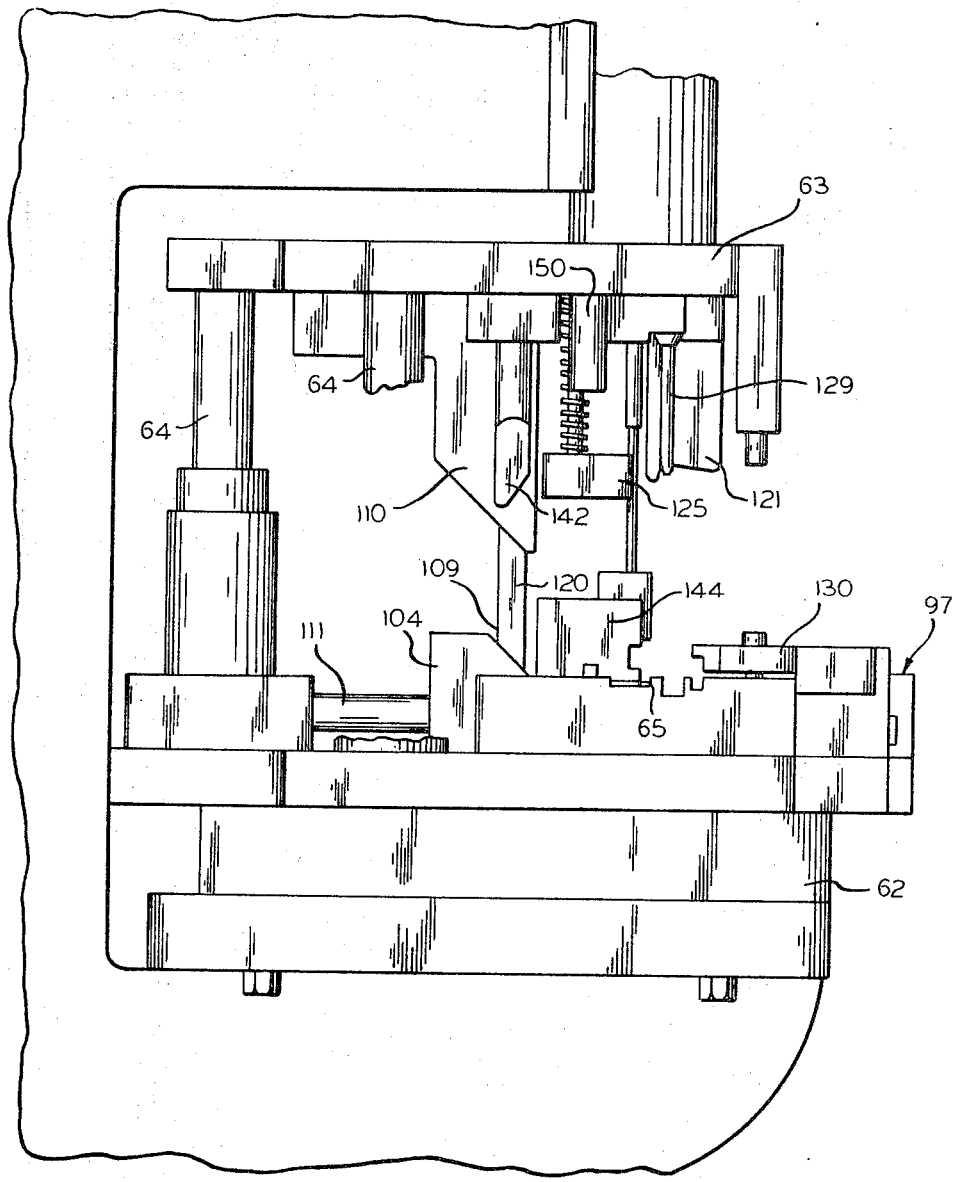
FIG. 2 is a fragmentary end elevational view of the machine of FIG. 1, viewing towards the left-hand end as seen in FIG. 1.
Figure 12:
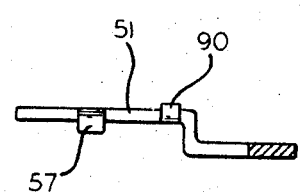
FIG. 12 is a side elevational view of the center terminal of a terminal set with the carrying and registering ribbon shown attached and in section.

The terminal applicator machine of the present invention, as especially seen in FIGS. 1 and 2, includes generally a base 62 and a head 63, wherein the base supports the machine on a suitable surface. The head 63 would be suitably mounted in order to enable it to move downwardly toward the base and return, wherein a downward stroke and an upward or return stroke would constitute one cycle of the machine. Thus, it can be seen that the machine operates basically like a punch press type machine such as like that disclosed in our U.S. Pat. 3,266,695. Accordingly, the head 63 would be mounted on a slide for reciprocal movement along the vertical toward and away from the base 62. The typical type punch press machine would employ a crank for obtaining this type of movement, and would be cycled by an operator. As seen particularly in FIG. 2, a plurality of press guides 64 would be provided to guide the head along a precise vertical path. A plurality of work stations are defined in the machine along which the continuous strip of terminal strips is advanced in step-by-step fashion, whereby particular work is performed to prepare the terminals and properly mount them and form them on the bobbins.

As seen in FIG. 1, the continuous strip of terminal sets is fed into the machine from the right side, wherein the terminal strip is advanced along a track that is particularly formed for receiving the terminals. This track may be identified in FIG. 2 by the numeral 65.

The feed mechanism for advancing the continuous strip of terminal sets 46 through the machine is arranged at the right-hand end of the machine as seen particularly in FIGS. 1 and 3, and other details of the feed mechanism are shown in FIGS. 5–8. The feed mechanism may be generally designated by the numeral 66, and includes a pair of parallel opposed supporting bars 67 extending in cantilever fashion from an extension 68 of the base 62 of the machine. An outer continuous strip guide member 69 which also functions to gauge the advance stroke of the terminal strip is adjustably clamped to the outer ends of the bars 67. This terminal strip guide, as seen particularly in FIG. 6, is provided with a track surface 70 that is shaped to receive the terminal strip 46. A retaining plate 71 is mounted on the guide to overlap a portion of the track surface 70 and aid in retaining the terminal strip in position. A pneumatically driven clamp 72 is slidably mounted on the bars 67 for slidable movement between the opposed surfaces 68a and 69a to grip the terminal strip when it is positioned against the surface 69a and drive it in a left-hand direction as viewed in FIGS. 3 and 5 toward the surface 68a during the driving stroke. When the clamp engages the surface 68a, it will release the terminal strip and thereafter return to the surface 69a for again clamping and advancing of the terminal strip. A double acting pneumatic cylinder (not shown) is mounted within the base extension 68 for driving the piston rod 73 that is secured to the clamp 72. The clamp 72 includes a base 74 having a track surface 75 thereon which is formed to receive the terminal strip 46, and a clamping bar 76 having a track surface 77 to mate with the terminal strip 46 in coaction with the track surface 75 of the base. The clamping bar 76 is operated between clamping and release positions by a pair of double acting air cylinders (not shown) mounted on the base 74 that drive the piston rods 78 which are in turn secured to opposite ends of the clamping bars 76. The air cylinders in the clamp 72 function to drive the clamping bar 76 into clamping relation with the terminal strip 46 when the clamp is positioned adjacent the surface 69a and during its drive stroke to the surface 68a, whereupon it then is driven to its release position relative to the terminal strip and maintained in its released position during the return stroke of the clamp when it moves toward the surface 69a. As already indicated, in order to change the drive stroke of the clamp 72, it is only necessary to change the position of the guide 69 along the bars 67 thereby moving the stop surface 69a toward or away from the stop surface 68a. A valve (not shown) for controlling the operation of the feed mechanism 66 is operable by the crank (not shown) of the machine which drives the head 63. The feed mechanism is a standard commercially available unit designated "Rapid-Air Model A–2" and is available from Mechanical Tool and Engineering Co., Rockford, Ill. Thus, it will be appreciated that operation of the valve by the crank of the machine will cause the clamp to be simultaneously opened to permit movement along the terminal strip and withdrawn to feed position during the downward stroke of the head 63. During the upward stroke of the head, the clamp is simultaneously closed and advanced to feed the strip into the machine one position and advance each terminal set to the next work station.

In order to prevent any possible backward movement of the terminal strip 46 during the return stroke of the clamp 72, an anti-back slide detent 79, pivotally mounted on top of the base extension 68 and in alignment with the carrying and registering ribbon 57 to engage in the carrying and registering holes 47a that are equally spaced along the carrying and registering ribbon, engages the registering holes 47a and prevents backward movement of the terminal strip 46 in the direction toward the right as viewed in FIG. 8. The detent 79 is biased by a spring 80 to assure engagement with the registering holes 47a, and forward movement of the strip 46 toward the left as viewed in FIG. 8 will merely drive the detent engaging end upwardly to slide across the carrying and registering ribbon until it can fall into the next registering hole 47a. Sufficient play is provided between the detent and each registering hole to permit accurate positioning of the terminal strip at each work station by suitable means such as a plurality of pilot pins 81 mounted on the head 63 which during the downward stroke of the head engage through aligned registering holes 47a of the strip and then into pilot pin receiving holes 82 formed in the base 62 as seen in FIG. 4. Thus the pilot pins 81 with rounded ends precisely position the terminal strip to place a terminal set at each of the work stations in the machine during the work stroke of the head 63. The pilot pins come into engagement with the terminal strip prior to any work being done on the terminal sets.

The first work performed on each terminal set is at a work station wherein an anti-distortion bar cutter 83, FIGS. 9 and 10, serves to cut the anti-distortion bar 54 from the outer free ends of the terminals. This cutter includes a fixed cutting member 84 mounted on the base of the machine, and a movable cutter element 85 mounted on the head of the machine. The cutting elements have co-acting cutting edges for cutting at the tip end of each terminal so that the anti-distortion bar falls off. To facilitate location of the anti-distortion bar relative to the cutting edges, the movable cutting head 85 is provided with a hood portion 86 having opposed inclined surfaces 87 that cam the anti-distortion bar into proper position especially if it may be bent to properly cut the anti-distortion bar from the terminals. This prevents cutting of a terminal so that one terminal might be shorter than another. The cut anti-distortion bar falls downwardly through a passageway 88 and for disposal. A pair of spring pressed retractable pins 89 are mounted in the cutting head 85 to first retract into the head when they initially engage the anti-distortion bar 54, and to thereafter, following actual cutting of the bar from the terminals, eject the bar downwardly through the passageway 88, thereby preventing possible entanglement of the cut bar with the advancing terminal strip.

Figures 13, 14:
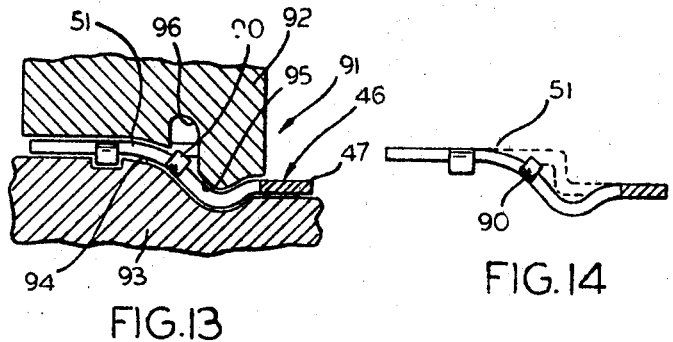
FIG. 13 is an enlarged sectional fragmentary view of the center terminal bending tool.
FIG. 14 is a side elevational view of a terminal set showing the relationship between an outer terminal and a central terminal after the latter has been formed in accordance with the tool of FIG. 13.

The center terminal 51 of each terminal set includes a pair of upwardly extending ears 90 that must be bent out of the plane of bobbin insertion before inserting the bobbin on the terminals, and this is accomplished by deforming the terminal at a work station following the removal of the anti-distoriton bar. A terminal bender, generally designated by the numeral 91, FIG. 13, includes a bending punch 92 mounted on the upper movable head 63, and a coacting die 93 supported by the base 62. The surface 94 of the die 93 is formed to coact with the surface 95 of the bending punch 92 to bend the center terminal 51 from its original shape as shown in dotted lines in FIG. 14 to its new shape as shown in solid lines in FIG. 14, whereby the ears 90 are shown to be moved below the upper surface of the center terminal. A recess 96 is formed in the face of the bending punch 92 to accommodate the ears 90 without distorting their shape. Thus, each center terminal of each terminal set is deformed as it passes through the work station where the terminal bender 91 is located.

Figure 15:
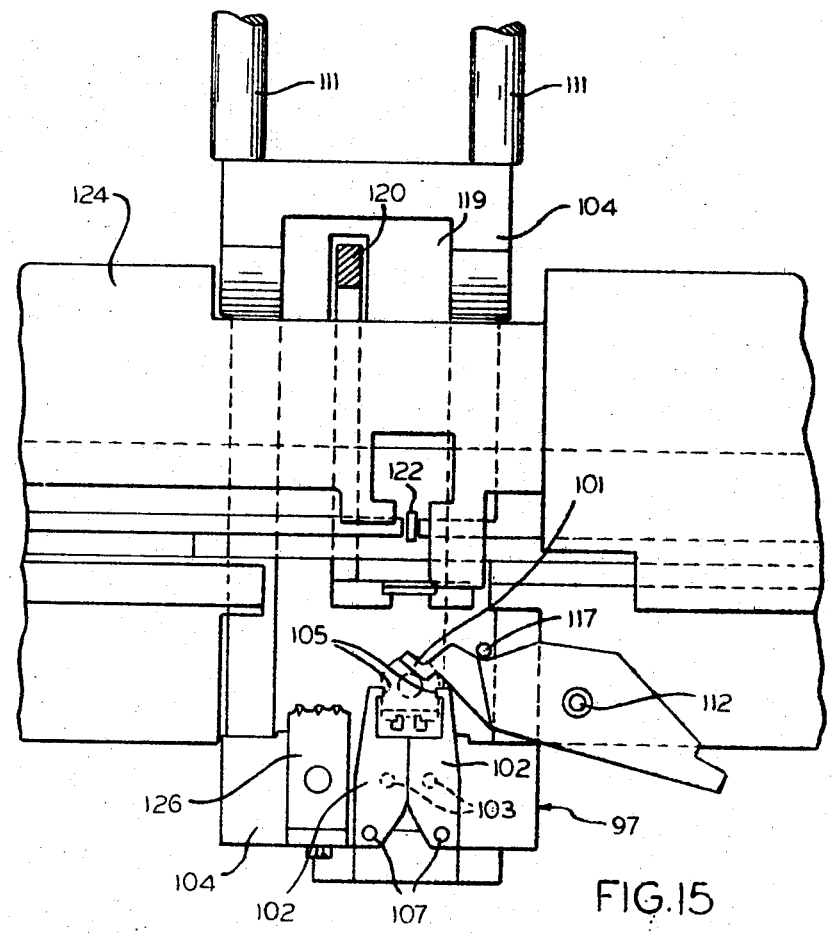
FIG. 15 is a fragmentary top plan view of the bobbin feed mechanism and terminal staking mechanism, with the guide plate removed for purposes of clarity.
Figure 16:
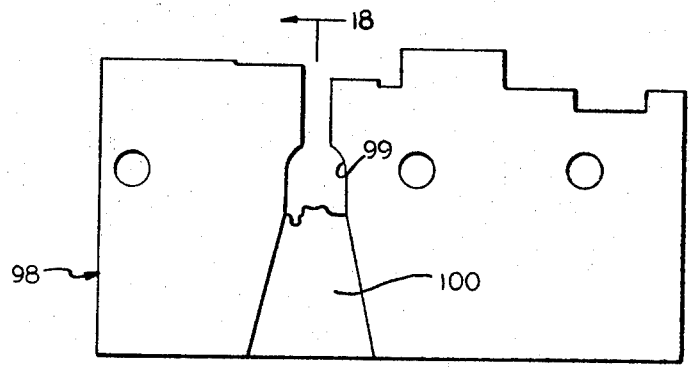
FIG. 16 is a top plan view of the guide and locator plate that fits over the bobbin feeder in a manner as is shown in phantom in FIG. 3.
Figure 19:
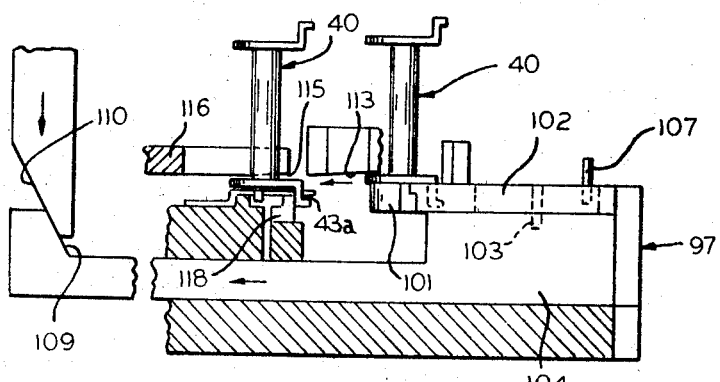
FIG. 19 is a sectional view taken through the bobbin feed mechanism, with some parts broken away for purposes of clarity, to illustrate the manner of inserting a bobbin onto a terminal set.

At the next work station, the terminal set receives a bobbin. Insertion of a bobbin onto a set of terminals is accomplished by the bobbin inserter and locator 97. See FIGS. 2, 3, and 15–19. The bobbin inserter includes a guide and locator plate 98 that includes a bobbin locating opening 99 into which a bobbin is inserted in an erect position where the tubular member 41 stands substantially vertical. To facilitate positioning of a bobbin in the opening 99, a recessed guide track 100 is provided in the top surface of the guide plate 98 which is wider at its inlet end than the width of an end flange of the bobbin and which narrows to the width of the bobbin and the width of the bobbin locating opening 99. The opening 99 would be formed to receive freely the end flange of a bobbin. When the bobbin is inserted through the opening 99, the flange is ultimately positioned below the plate 98 and in resting position against a movable stop 101. The bobbin is further guided into position to be engaged by a pair of coacting gripping fingers 102. Each finger 102 is pivotally mounted at 103 to a cam operated slide 104 that is located below the guide and locator plate 98. The guide and locator plate 98 is shown removed from FIGS. 3, 15, and 19 for purposes of clarity, but is shown in position in phantom in FIG. 3. This plate will be fixed to the base and not movable with the slide 104.

Figure 17:
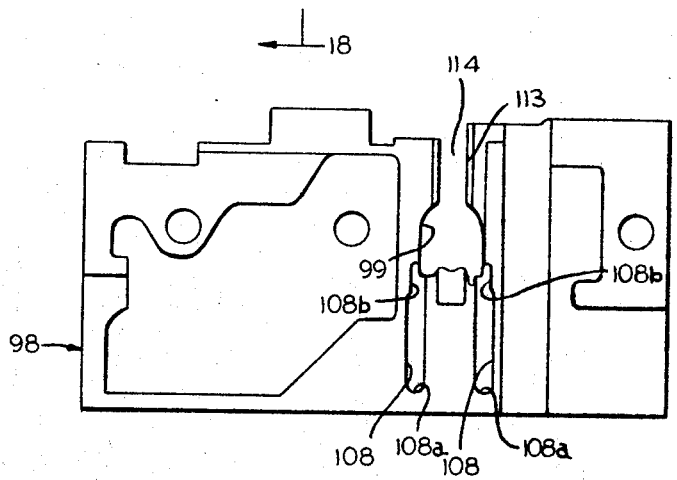
FIG. 17 is a bottom plan view of the guide and locator plate of FIG. 16.
Figure 18:
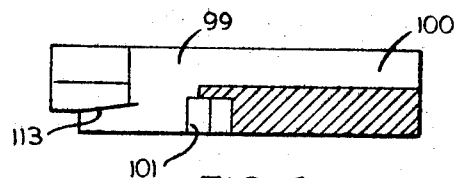
FIG. 18 is an enlarged sectional view taken substantially along line 18—18 of FIG. 16.
Figure 20:
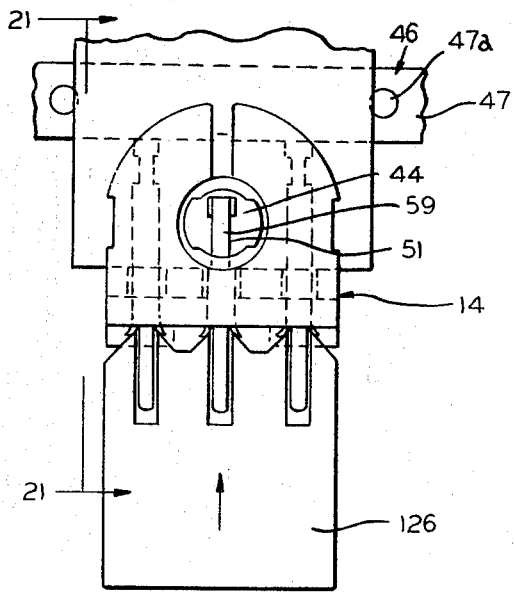
FIG. 20 is a greatly enlarged top plan view of the terminal staking tool and illustrating the manner in which it stakes the terminals to a bobbin.

The bobbin gripping fingers 102 include gripping lugs 105 at their outer free ends which engage in recesses 106 formed in the end flanges of a bobbin to hold the bobbin in position. However, it will be appreciated that the fingers so engage the flange to enable the slight vertical movement of the bobbin when inserting same on the terminals. Opening and closing of the gripper fingers 102 is controlled by cam follower pins 107 extending upwardly from the fingers and slidably engageable in cam tracks 108 formed in the bottom side of the guide and locator plate 98 (FIG. 17). When the bobbin gripping fingers are in their bobbin receiving position as shown in the drawings, the cam follower pins 107 will be at the rear ends of the cam tracks 108 as designated by the numeral 108a. And upon insertion of the bobbin, the forward movement of the fingers 102 causes the cam follower pin 107 to travel forwardly and ultimately be engaged by the rise 108b in the cam track to cause opening of the gripper fingers to release the bobbin. Suitable spring biasing means (not shown) causes the gripper fingers 102 to close upon return of the slide 104 to home position and the retraction from the cam track rises 108b of the cam follower pins 107. Opening of the fingers allows withdrawal of the fingers to the home position for again receiving another bobbin. Advancing of the slide 104 is accomplished by a cam member 109 (FIG. 20) that coacts with a camming drive member 110 mounted on the head 63. Return of the slide to its home position is effected by a pair of spring pressed rods 111 mounted in the base and extending horizontally. Thus, on the downward stroke of the head 63, the slide 104 is driven forward to insert a bobbin onto a terminal set, and upon the return stroke of the head 63, the spring pressed rods 111 cause return of the slide and bobbin holder to its home position.

During the insertion stroke of the bobbin and the forward movement of the slide 104, the fingers 102 engage the movable stop 101 which is pivotally mounted on a shaft 112 that is fixed to the base, whereby the stop 101 is moved out of position from beneath the bobbin to allow the bobbin to be moved downwardly. Downward movement of the bobbin is effected by a camming surface 113 formed on the underside of the guide and locator plate 98 at both sides of a slot 114 formed therein and through which the tubular member of the bobbin advances. The level of the terminal receiving openings of the bobbin when the bobbin is initially inserted into the bobbin holder is above the level of the terminals. The lower flange of a bobbin 40 is positioned over the outer ends of the terminals prior to complete alignment of the terminals with the terminal receiving openings. Final positioning and orientation of the bobbin and its terminal receiving openings with respect to the terminals is effected by a further camming surface 115 (FIG. 19) that is formed on a rear holddown plate 116. Movement of the bobbin inwardly and downwardly substantially eliminates any possible interference between a terminal of a terminal set that might be slightly bent upwardly. The movable stop 101 does not move completely out from beneath the bobbin until the bobbin is partially over the terminals. A pin 117 mounted on the slide 104 serves to return the movable stop to its home position upon the return stroke of the slide.

While the bobbin is being driven onto the terminals, a movable terminal support 118 is moved inwardly by the depending bobbin wall 43a (FIG. 19) to properly support the terminals during the insertion operation. The terminal support 118 is connected to a movable slide 119 that is actuated by a reverse cam 120 upon the return or upward stroke of the machine head 63 to return the terminal support 118 to its home position following advancing of the just inserted bobbin from the bobbin insertion work station to perform the terminal supporting operations for the next bobbin insertion step.

Prior to movement of the bobbin to inserted position on the terminals, the center terminal 51 is cut from the carrying and registering ribbon 47 by a punch 121 (FIGS. 1 and 2) supported from the head 63 and a die 122 (FIG. 3) supported on the base 62. The punch 121 is shaped to permit the bobbin to move thereagainst where it is slotted at 123 (FIG. 30). Prior to cutting of the center terminal, a rear holddown plate 124 (FIG. 3) will be moved to clamping position against a spring mounting to rigidly hold the bobbin down against the base and ultimately the center terminal in firm position during cutting thereof. A spring biased rear holddown plate actuator 125 is mounted on the head 63 that engages the rear holddown plate on the downward stroke of the head and drives the rear holddown plate into clamping position. The pilot pins 81 register the location of the terminal strip before movement of the rear holddown plate into clamping position. A slug is cut from the center terminal by the punch 121, and is sucked out by a vacuum device to insure removal and preclude possible entanglement with the terminal strip as it is advanced through the machine. A valve (not shown) actuating the vacuum device may be actuated by a cam on the crankshaft of the machine which drives the head 63.

Figure 21:
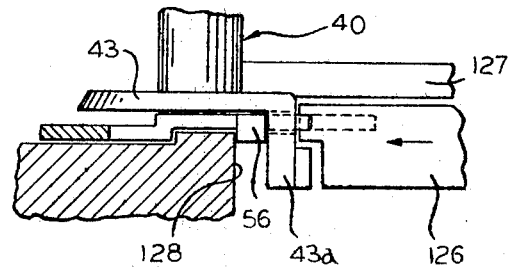
FIG. 21 is a side elevational view of the terminal staking tool, taken substantially along line 21—21 of FIG. 20.
Figure 22:
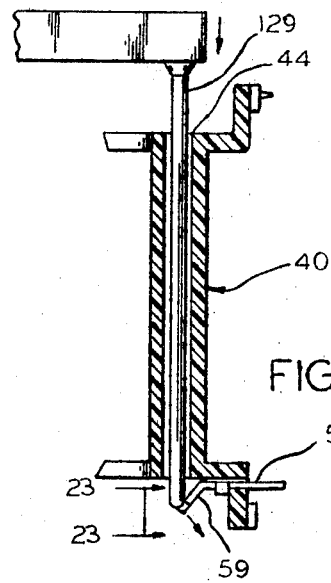
FIG. 22 is an enlarged vertical sectional view taken through a bobbin and illustrating the center terminal bending tool extending through the bobbin and in engagement with the center terminal.

At the next work station, the terminals are fastened to the bobbin by a staking operation. While all of the terminals are herein illustrated as being staked to the bobbin, it should be appreciated that only one or more of the terminals need be staked if the others are not needed, and then the unwanted terminals would either be ejected by the machine or the final user of the bobbin. All work performed on the terminals is pursuant to the down stroke of the head, while the up stroke serves to return the bobbin inserter, feed the terminal strip, and return the terminal support bar. However, the terminal support bar return will be timed so that it is not returned until the bobbins will have been advanced to the next work station. As seen particularly in FIGS. 15, 20, and 21, a staking tool 126 is attached to the bobbin inserting slide 104, and accordingly movable therewith but at the next succeeding work station. A bar 127 (FIGS. 3 and 21) is mounted in superposed relation to the staking tool 126 and also moves with the slide 104 to advance the bobbin 40 to home position wherein the downwardly extending terminal ears 56 on the terminals 49 and the terminal ears 57 on the terminal 51 are abutted by the flange wall 43a. The bar 127 also serves to aid in holding down the bobbin 40 by moving into superimposed relation with respect to the lower bobbin flange 43. The downwardly extending ears 56 and 57 also are backed against a wall 128 (FIG. 21) during the staking operation.

Figure 23:
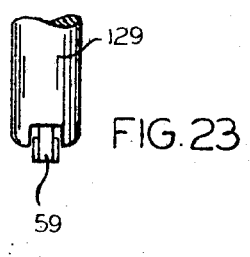
FIG. 23 is a greatly enlarged fragmentary view of the lower end of the bending tool of FIG. 22, and looking generally along the line 23—23 of FIG. 22.
Figure 25:
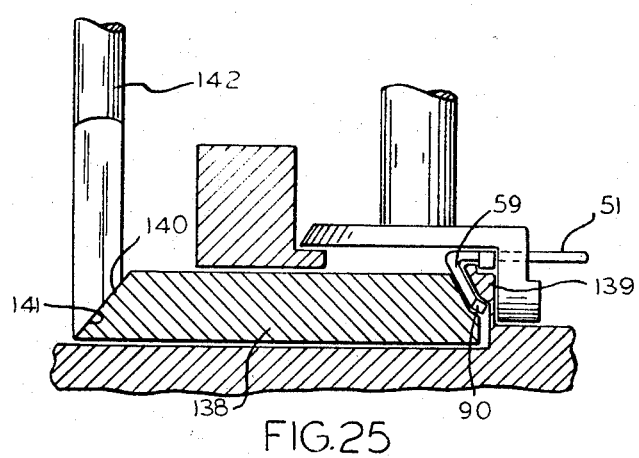
FIG. 25 is a view similar to FIG. 24 but illustrating another cam operated bending tool for still further bending of the center terminal.

The bobbin at the next work station, where the terminals are now securely fastened thereto, positions the center terminal for a bending operation by a bending tool 129 mounted on the head 63 that enters the hole 44 of the bobbin from the upper end to engage and bend the wire attaching end 59 of the center terminal 51 about 75°. The lower end of the bending tool 129 is bifurcated as seen in FIG. 23 to facilitate its engagement with the center terminal 51 which is aligned with the opening 44 of the bobbin.

During the bending of the center terminal 51, the bobbin at this work station and following work stations is held firmly by a front holddown plate 130 that is spring mounted to the base 62, FIGS. 1 and 3. A front holddown plate actuator 131 having engaging pins 132 (FIG. 1) moves the holddown plate 130 to clamping position upon downward movement of the head 63. Likewise, the holddown plate 130 returns to non-clamping position upon return of the head 63 upward to its home position.

Figure 24:
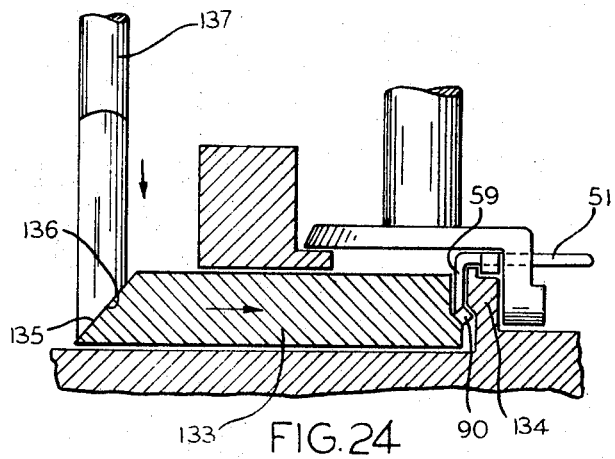
FIG. 24 is an enlarged sectional view taken through the cam operated bending tool for bending the center lug.

The wire attaching end 59 of the center terminal 51 is further deformed by a slidable cam operated bending tool 133 coacting with a die form 134, FIG. 24, to bend the main part of the attaching end 59 to a position about ninety degrees from the horizontal position of the terminal, and the ears 90 to a position forty-five degrees from the attaching end section. An inclined cam surface 135 is formed on the rear end of the cam slide 133 to coact with an inclined surface 136 on a cam bar 137 that is attached to the head 63 and movable therewith, whereby the forming operation of the center terminal is accomplished during the downward stroke of the head and while the bobbins are at rest at their work stations.

A further metal forming operation is performed on the wire attaching end 59 of the center terminal 51 by a second cam operated forming tool 138, slidable on the base and coating with a forming die 139 fixed to the base. A camming surface 140 is provided at the rear end of the slidable forming tool 138 for coaction with a cam surface 141 on a cam bar 142 that is mounted on the head 63. This forming operation bends the wire attaching end 59 of the center terminal ten to fifteen degrees over normal to positively position the ears 90 out of alignment with the opening 44 in the bobbin so that the reed switch can thereafter be easily inserted in the bobbin.

The following work station effects severing of the registering and carrying strip from the outer terminals 49 by effectively cutting a slug 143 (FIG. 27) from the carrying and registering ribbon and the attached terminals 49. This cutting operation is performed by a punch 144 mounted on the base 62 and spring biased upwardly by springs 145 to the upper home position as limited by a pair of nut and bolt units 145. The punch 144 includes a cutting element 147 coacting with a cutting die 148 formed on the base 62. In order to effect the proper cutting operation, a longitudinally extending slot 149 is formed in the punch 144 and through which the rear end of the lower flange 43 passes during its movement through the machine and through the work station where this punch is located. The punch 144 is actuated by a pin 150 that is mounted on the head 63 and movable downwardly with the head on the downward stroke.

Following of the cutting of the terminals 49 from the carrying and registering ribbon, the bobbin with its terminals thereon is ejected from the machine on the left-hand end as illustrated in phantom in FIG. 1. Thus, a series of terminal sets, some with bobbins and some without, are having work performed thereon during each of the strokes of the head 63, and between strokes the terminal strip is advanced one step along with those bobbins that have been inserted on terminal sets of the strip. Applications of terminals to the other ends of the bobbins, if desired, can be done by running the bobbins again through the machine with the other end being inserted first in the bobbin inserter.

It will be understood that modifications and variations may be effected without departing from the scope of the novel concepts of the present invention.

The invention is hereby claimed as follows:

1. In a machine for receiving a continuous strip of terminal sets and bobbins for successively mounting a set of terminals on each bobbin, wherein each said bobbin has a plurality of terminal receiving openings, said strip of terminal sets includes a carrying and registering ribbon having the terminal sets extending from one edge thereof, and each terminal set includes a plurality of terminals interconnected at the ends opposite the ribbon by an anti-distortion bar, said machine including means for indexing said strip through and registering said strip in location at a plurality of work stations on the machine, means for cutting the anti-distortion bar from each set of terminals leaving the ends open for receiving a bobbin at one work station, a holder for receiving a bobbin and means for moving said holder between first and second positions for inserting a bobbin onto a set of terminals at another work station and effectively mounting the bobbin onto said ribbon so that the bobbin is thereafter advanced through the other work stations by the indexing of said strip, means for staking at least one terminal in each set of terminals to the bobbin at another work station, and means for severing terminals from the ribbon at another work station.

2. In a machine as defined in claim 1, and means for bending and severing one of said terminals from the ribbon ahead of said first mentioned terminal severing means at the bobbin insertion work station.

3. In a machine as defined in claim 1, and means for operating said strip indexing means in timed relation to said cutting means, said holder, said staking means and said severing means.

4. In a machine as defined in claim 1, wherein said registering means includes a plurality of pilot pins engaging spaced holes in said ribbon.

5. In a machine as defined in claim 1, means for operating said strip indexing means in timed relation to said cutting means, said holder, said staking means and said severing means, and wherein said registering means includes a plurality of pilot pins engaging spaced holes in said ribbon.

6. In a machine for receiving a continuous strip of terminal sets and bobbins for successively mounting a set of terminals on each bobbin, wherein each said bobbin has a plurality of terminal receiving openings, said strip of terminals sets includes a carrying and registering ribbon having the terminal sets extending from one edge thereof, and each terminal set includes a plurality of terminals interconnected at the ends opposite the ribbon by an anti-distortion bar, said machine including a base, a vertically movable head over said base, means for cycling said machine to drive said head through a downward or forward stroke and an upward or return stroke, a plurality of work stations on said base, track means on said base for receiving and supporting said strip of terminal sets, strip feeding means on said base for indexing said strip through said work stations, said carrying ribbon of said strip having equally spaced registering holes therealong, pilot pins on said head coacting with pilot pin holes on said base for engaging said carrying ribbon registering holes and precisely locating the terminal sets at said work stations, coacting cutting members on said head and base at one work station for cutting the anti-distortion bar from each terminal set, bobbin receiving and inserting means on said base at another work station for inserting a bobbin onto a set of terminals, coacting driving means on said head and base for driving said bobbin receiving and inserting means during cycling of said machine, staking means on said base at another work station driven by coacting head and base means to stake at least one terminal of each set to a bobbin, and coacting cutting members on said head and base at another work station for cutting the carrying and registering ribbon from the terminals.

7. In a machine as defined in claim 6, and coacting metal forming members on said head and base at one work station ahead of said bobbin inserting station for applying a predetermined contour to one terminal of each set for facilitating terminal clearance when inserting the bobbin on the terminals.

8. In a machine as defined in claim 7, and coacting cutting members on said head and base at the bobbin inserting station for cutting one of said terminals from said carrying and registering strip.

9. In a machine as defined in claim 8, and a metal bending member on said head at another work station for bending a part of one terminal relative the bobbin at a work station following the staking station.

10. In a machine as defined in claim 9, and a cam operated slide member on said base following the metal bending station for applying a further bend to said one terminal bent by said metal bending member.

11. A method of successively applying sets of terminals from a continuous strip of terminal sets to bobbins, wherein the bobbins include terminal receiving openings and said strip includes a carrying and registering ribbon having side-by-side sets of terminals extending perpendicularly from one edge and interconnected at their free ends by an anti-distortion bar, said method comprising the steps of indexing said strip step-by-step along a track and through a plurality of work stations by an indexing means, cutting the anti-distortion bar from the terminals at one station by a cutting means, inserting a bobbin on each set of terminals at another station by an inserting means, staking at least one of the terminals to the bobbin at another station by a staking means, and severing the ribbon from the terminals at another station by a severing means.

12. A method as defined in claim 11, and the step of forming at least one of the terminals before and after insertion of the bobbin thereon.

References Cited

UNITED STATES PATENTS

| | | | |
|---|---|---|---|
| 2,409,147 | 10/1946 | Neuhaus et al. | 29—203DT |
| 3,266,695 | 8/1966 | Cervenka et al. | 227—96 |
| 3,350,765 | 11/1967 | Karl | 29—203DT |
| 3,386,153 | 6/1968 | Lau et al. | 29—203DT |

THOMAS H. EAGER, Primary Examiner

U.S. Cl. X.R.

29—203, 628